United States Patent [19]

Hsia Chen et al.

[11] Patent Number: 4,568,786

[45] Date of Patent: * Feb. 4, 1986

[54] PRODUCTION OF LUBRICANT RANGE HYDROCARBONS FROM LIGHT OLEFINS

[75] Inventors: Catherine S. Hsia Chen, Berkeley Heights; Samuel A. Tabak, Wenonah, both of N.J.

[73] Assignee: Mobil Oil Corporation, New York, N.Y.

[*] Notice: The portion of the term of this patent subsequent to May 28, 2002 has been disclaimed.

[21] Appl. No.: 709,143

[22] Filed: Mar. 7, 1985

Related U.S. Application Data

[63] Continuation-in-part of Ser. No. 598,139, Apr. 9, 1984, Pat. No. 4,520,221.

[51] Int. Cl.$^4$ .............................................. C07C 2/02
[52] U.S. Cl. .................................... 585/517; 585/533
[58] Field of Search ................................ 585/517, 533

[56] References Cited

U.S. PATENT DOCUMENTS

| | | | |
|---|---|---|---|
| 4,211,640 | 7/1980 | Garwood et al. | 208/255 |
| 4,414,423 | 11/1983 | Miller | 585/517 |
| 4,433,185 | 2/1984 | Tabak | 585/312 |
| 4,450,311 | 5/1984 | Wright et al. | 585/413 |
| 4,456,779 | 6/1984 | Owen et al. | 585/415 |

Primary Examiner—Curtis R. Davis
Attorney, Agent, or Firm—A. J. McKillop; M. G. Gilman; L. G. Wise

[57] ABSTRACT

Olefin upgrading in plural reactors can achieve conversion of lower olefinic feedstock, such as propene, butene, etc., to valuable heavy hydrocarbons containing a lubricant fraction of high viscosity index. Other fuel products, such as ($C_{10}$-$C_{20}$) distillate, gasoline and LPG may also be recovered as products. In a preferred process for converting lower olefinic feed to heavier hydrocarbons by contacting the feed with a shape selective medium pore acidic zeolite catalyst at elevated temperature and pressure the catalyst surface is rendered relatively inactive by adding to the olefinic feed an inactivating amount of a sterically-hindered organic base, whereby the catalyst is selectively surface-deactivated, to produce substantially linear heavier hydrocarbons rich in $C_{10}^+$ olefins. In the preferred multistage process the olefinic feed comprises $C_2$-$C_8$ olefins and the catalyst employed in each stage comprises aluminosilicate having a silica-to-alumina mole ratio of at least 12 and a constraint index of about 1 to 12.

15 Claims, 1 Drawing Figure

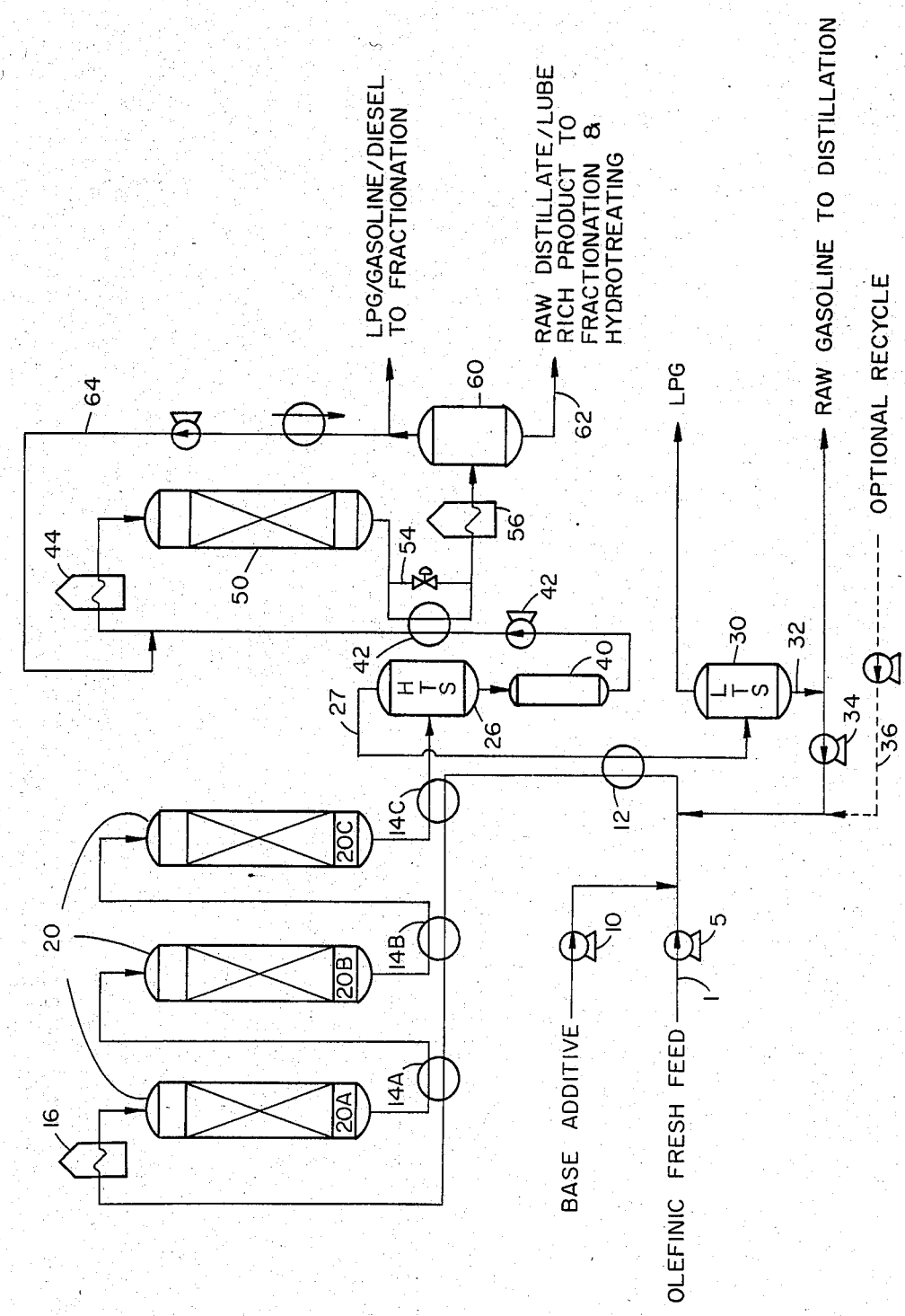

PRODUCTION OF LUBRICANT RANGE HYDROCARBONS FROM LIGHT OLEFINS

REFERENCE TO COPENDING APPLICATION

This application is a continuation-in-part of U.S. patent application Ser. No. 598,139, filed Apr. 9, 1984 now U.S. Pat. No. 4,520,221, incorporated herein by reference.

FIELD OF THE INVENTION

This invention relates to a technique for the manufacture of high viscosity index lubricant range hydrocarbons. In particular, it provides a multi-stage system for operating an olefins conversion plant wherein a oligomerization catalyst, such as shape selective medium pore crystalline zeolite of the ZSM-5 type, is employed for upgrading olefinic feedstocks containing $C_3^+$ alkenes at elevated temperature and pressure.

BACKGROUND OF THE INVENTION

Recent work in the field of olefin upgrading has resulted in a catalytic process for converting lower olefins to heavier hydrocarbons. Heavy distillate and lubricant range hydrocarbons can be synthesized over ZSM-5 type catalysts at elevated temperature and pressure to provide a product having substantially linear molecular conformations due to the ellipsoidal shape selectivity of certain medium pore catalysts.

Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Particular interest is shown in a technique developed by Garwood, et al., as disclosed in European patent application No. 83301391.5, published Sept. 29, 1983. In U.S. Pat. Nos. 4,150,062; 4,211,640 and 4,227,992 Garwood et al disclose the operating conditions for the Mobil Olefin to Gasoline/Distillate (MOGD) process for selective conversion of $C_3^+$ olefins to mainly aliphatic hydrocarbons.

In the process for catalytic conversion of olefins to heavier hydrocarbons by catalytic oligomerization using a medium pore shape selective acid crystalline zeolite, such as ZSM-5 type catalyst, process conditions can be varied to favor the formation of hydrocarbons of varying molecular weight. At moderate temperature and relatively high pressure, the conversion conditions favor $C_{10}^+$ aliphatic product. Lower olefinic feedstocks containing $C_2$-$C_8$ alkenes may be converted; however, the distillate mode conditions do not convert a major fraction of ethylene. A typical reactive feedstock consists essentially of $C_3$-$C_6$ mono-olefins, with varying amounts of nonreactive paraffins and the like being acceptable components.

It is a main object of this invention to provide an improved process for upgrading olefins to valuable lubricant quality product. Significantly improved linearity can be achieved by employing a primary stage catalyst comprising a medium pore shape selective siliceous zeolite with a substantially inactive surface.

SUMMARY OF THE INVENTION

A multi-stage process has been devised for converting a feedstock comprising lower olefins to form higher hydrocarbons, particularly lubricants. In a preferred embodiment, a multi-stage process is provided for producing hydrocarbons by oligomerizing lower olefin feed at moderate temperature and elevated pressure which comprises contacting the lower olefin in a primary reactor stage under oligomerization conditions with a medium pore siliceous zeolite catalyst having acid cracking activity, and a constraint index of about 1 to 12; wherein said zeolite has acidic pore activity and wherein the zeolite surface is substantially inactive for acidic reactions. After separating the primary stage effluent to obtain a heavy fraction rich in substantially linear $C_{10}^+$ intermediate olefins, the process is completed by contacting the heavy fraction in a secondary reactor stage with an acidic catalyst to upgrade the heavy fraction to a high viscosity index lubricant range hydrocarbon. This technique is advantageous for producing $C_{20}^+$ heavy hydrocarbons comprising lubricant or heavy distillate range compounds having a substantially linear molecular conformation from lower olefins, such as $C_3$ to $C_6$ mono-olefins.

In addition a continuous method for operating the primary stage has been devised wherein the catalyst surface is modified by chemisorption by cofeeding a surface-modifying agent with the olefinic feedstock. Sterically-hindered basic compounds are particularly useful for injection deactivation of surface acid sites.

These and other objects and features of the invention will be understood from the following detailed description and drawings.

THE DRAWING

The FIGURE is a schematic representation of a fixed bed reactor system and product separation system, according to the present invention, showing process flow streams and unit operations.

DESCRIPTION OF THE PREFERRED EMBODIMENTS

The shape-selective oligomerization/polymerization catalysts preferred for use herein include the crystalline aluminosilicate zeolites having a silica to alumina molar ratio of at least 12, a constraint index of about 1 to 12 and acid cracking activity of about 50–300. Representative of the ZSM-5 type zeolites are ZSM-5, ZSM-11, ZSM-12, ZSM-23, ZSM-35 and ZSM-38. ZSM-5 is disclosed and claimed in U.S. Pat. No. 3,702,886 and U.S. Pat. No. Re. 29,948; ZSM-11 is disclosed and claimed in U.S. Pat. No. 3,709,979. Also, see U.S. Pat. Nos. 3,832,449 for ZSM-12; 4,076,842 for ZSM-23; 4,016,245 for ZSM-35 and 4,046,839 for ZSM-38. The disclosures of these patents are incorporated herein by reference. A suitable shape selective medium pore catalyst for fixed bed is a small crystal H-ZSM-5 zeolite (silica:alumina ratio =70:1) with alumina binder in the form of cylindrical extrudates of about 1-5mm. Unless otherwise stated in this description, the catalyst shall consist essentially of ZSM-5, which has a crystallite size of about 0.02 to 0.05 micron. Other pentasil catalysts which may be used in one or more reactor stages include a variety of medium pore (~5 to 9 Å) siliceous materials such as borosilicates, ferrosilicates, and/or aluminosilicates disclosed in U.S. Pat. Nos. 4,414,423 and 4,417,088, incorporated herein by reference.

The acid catalysts may be deactivated by pretreatment with a surface-neutralizing base, as disclosed by Chen in copending U.S. patent application Ser. No. 598,139 filed Apr. 9, 1984, incorporated by reference.

Secondary stage catalyst may comprise acid zeolites; however, other acid materials may be employed which catalyze ethylenic unsaturation reactions. Other desirable materials for the secondary reaction include HZSM-12, as disclosed in U.S. Pat. No. 4,254,295 (Tabak) or large-pore zeolites in U.S. Pat No. 4,430,516 (LaPierre et al). Advantage may be obtained by selecting the same type of unmodified catalyst for both stages. Since the final stage is usually conducted at lower temperature than the initial reaction, higher activity may be maintained in the secondary reactor. However, the second stage catalyst can be any acid catalyst useful for polymerizing olefins. Particularly suitable are unmodified medium pore ZSM-5 type zeolites with a Constraint Index of 1–12, preferably of small crystal size (less than 1 micron). Also suitable are small pore zeolites, e.g., ZSM-34; large pore zeolites, e.g., mordenite, ZSM-4; synthetic faujasite; crystalline silica-aluminophosphates; amorphous silica-alumina; acid clays; organic cation exchange resins, such as cross linked sulfonated polystyrene; and Lewis acids, such as $BF_3$ or $AlCl_3$ containing suitable co-catalysts such as water, alcohols, carboxylic acids; or hydrogen halides.

Shape-selective oligomerization, as it applies to the conversion of $C_2$–$C_{10}$ olefins over ZSM-5, is known to produce higher olefins up to $C_{30}$ and higher. As reported by Garwood in Intrazeolite Chemistry 23, (Amer. Chem. Soc., 1983), reaction conditions favoring higher molecular weight product are low temperature (200°–260° C.), elevated pressure (about 2000 kPa or greater), and long contact time (less than 1 WHSV). The reaction under these conditions proceeds through the acid-catalyzed steps of (1) oligomerization, (2) isomerization-cracking to a mixture of intermediate carbon number olefins, and (3) interpolymerization to give a continuous boiling product containing all carbon numbers. The channel systems of ZSM-5 type catalysts impose shape-selective constraints on the configuration of the large molecules, accounting for the differences with other catalysts.

The following model reaction path for propylene is set forth for purposes of explanation, and it should be taken as a theoretical path, as the process is presently understood by workers in the field.

$C_3^=$ (propylene) oligomerization ⟶ $C_6^=$, $C_9^=$, $C_{12}^=$, etc.

($C_3$ oligomers);

Isomerization and cracking ⟶ $C_3^=$, $C_4^=$, $C_5^=$, $C_6^=$, $C_7^=$, etc.;

Interpolymerization ⟶

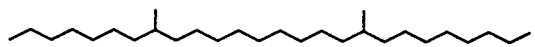

(representative structure).

The desired oligomerization-polymerization products include $C_{10}^+$ substantially linear aliphatic hydrocarbons. The ZSM-5 catalytic path for propylene feed provides a long chain with approximately one lower alkyl (e.g., methyl) substituent per 8 or more carbon atoms in the straight chain. The lubricant range final product can be depicted as a typical linear molecule having a sparingly-substituted (saturated) long carbon chain, as follows:

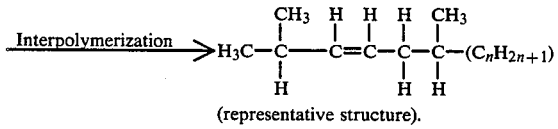

The final molecular conformation is influenced by the pore structure of the catalyst. For the higher carbon numbers, the structure is primarily a methyl-branched straight olefinic chain, with the maximum cross section of the chain limited by the 5.4×5.6 Angstrom dimension of the largest ZSM-5 pore. Although emphasis is placed on the normal 1-alkenes as feed stocks, other lower olefins such as 2-butene or isobutylene, are readily employed as starting materials due to rapid isomerization over the acidic zeolite catalyst. At conditions chosen to maximize heavy distillate and lubricant range products ($C_{20}^+$) the raw aliphatic product is essentially mono-olefinic. Overall branching is not extensive, with most branches being methyl at about one branch per eight or more atoms.

The viscosity index of a hydrocarbon lube oil is related to its molecular conformation. Extensive branching in a molecule usually results in a low viscosity index. It is believed that two modes of oligomerization/polymerization of olefins can take place over acidic zeolites such as HZSM-5. One reaction sequence takes place at Brönsted acid sites inside the channels or pores, producing essentially linear materials. The other reaction sequence occurs on the outer surface, producing highly branched material. By decreasing the surface acid activity (surface α-value) of such zeolites, fewer highly branched products with low VI are obtained.

Several techniques may be used to increase the relative ratio of intra-crystalline acid sites to surface active sites. This ratio increases with crystal size due to geometric relationship between volume and superficial surface area. Deposition of carbonaceous materials by coke formation can also shift the effective ratio. However, enhanced effectiveness is
observed where the surface acid sites of small crystal zeolites are reacted with a chemisorbed organic base or the like.

Catalysts of low surface activity can be obtained by using medium pore zeolites of small crystal size that have been deactivated by basic compounds, examples of which are amines, phosphines, phenols, polynuclear hydrocarbons, cationic dyes and others. These compounds all must have a minimum cross section diameter of 5 Å or greater. Examples of suitable amines include monoamines, diamines, triamines, aliphatic and aromatic cyclic amines and heterocyclic amines, porphines, phthalocyanines, 1,10-phenanthroline, 4,7-diphenyl-1, 10-phenanthroline, 3,4,7,8-tetramethyl-1, 10-phenanthroline, 5,6-benzoquinoline, 2,2':6',2"-terpyridine, 2,4,6-tri(2-pyridyl)-S-triazine and 2,3-cyclododecenopyridine. Examples of phosphines include triphenylphosphine and 1,2-bis(diphenylphosphine)ethane. Suitable phenols are, for example, di-t-butylphenol, alkylated naphthol and 2,4,6-trimethylphenol. Polynuclear hydrocarbons include substances such as pyrene and phenanthrene. Cationic dyes include thionine, methylene blue and triphenylmethane dyes, such as malachite green and crystal violet. Another surface modification technique is deactivation by treating with metal compounds. Suitable metal compounds are magnesium acetate, metal-porphines, such a hemin or iron (III) porphine chloride, cobalticinium chloride $(C_5H_5)_2CoCl$, and titanocene dichloride (biscyclopentadienyl titanium dichloride), large complex cations such as $[Co(NH_2R)_6]^{2+}$, where R=H, alkyl, $[Pt(NH_2R)_4]^{2+}$, where R=alkyl, $[co(en)_3]^{3+}$ where en=ethylenediamine, manganese (III) meso-tetraphenylporphine.

The catalysts may be treated with organic silicon compounds, as described in U.S. Pat. Nos. 4,100,215 and 4,002,697 to impart the desired degree of surface deactivation while being essentially free of carbonaceous deposits. Such treatment involves contacting the catalyst with a silane surface modifying agent capable of deactivating catalytic (acidic) sites located on the external surface of the zeolite by chemisorption. Those amines with an effective cross section larger than about 5 Angstroms are suitable especially substituted quinolines, heterocyclic amines and alkyl-substituted pyridines such as 2,4 or 2,6-di-alkyl pyridines. Preferred are bulky, sterically-hindered di-ortho-alkyl pyridines, such as 2,6-di-tertiary-butylpyridine.

The lower molecular weight $C_6$-$C_{20}$ intermediate materials formed over the modified catalyst are relatively linear olefins. These olefins can be effectively converted to lube range materials by additional polymerization. Accordingly, lube range materials can be obtained in accordance with the present invention in a two-stage process. Generally the first stage involves oligomerization of an inexpensive lower olefin of, e.g., propylene at about 200° C. over a surface poisoned HZSM-5. The second stage involves further oligomerization/interpolymerization of the product (or a fraction of the product) from the first stage over a second and/or different acid catalyst, which may be modified or unmodified as disclosed herein, at about 100°-260° C. The temperature of the second stage is usually lower than that of the first stage, i.e., about 25°-75° C. lower and preferably the catalyst is an unmodified ZSM-5 type catalyst. Both high yields and high VI are achieved by this two-stage process.

Conventional temperatures, pressures and equipment may be used in the novel process disclosed herein. Preferred temperatures may vary from about 100° to about 350° C., preferably 150° to 250° C. pressures from about atmospheric to 20,000 kPa (3000 psi) and WHSV from about 0.01 to about 2.0, preferably 0.2 to 1.0 are employed.

The flowsheet diagram of FIG. 1 shows the process relationships of the inventive multi stage process, depicting the conversion of a $C_3$-$C_6$ rich olefinic, interstage phase separation and recycle. Heavy hydrocarbons are recovered by fractionation and may be sent to a conventional hydrotreating unit for product finishing.

GENERAL PROCESS DESCRIPTION

The olefinic feedstock supply 1 is to process pressure by means of pump 5. The primary stage I is operated continuously in a series of fixed bed downflow reactors by adding a sterically-hindered nitrogenous base to lower olefin feed at a rate sufficient to maintain surface inactivity in the catalyst. Preferably, 2,6-di-(t-butyl)-pyridine is injected into the feed at a concentration of about 5 to 1000 ppm by pump 10. The mixture is a hydrocarbon solution of preheated by passing sequentially through a series of heat exchange means 12 and reactant effluent exchangers 14C, 14B, 14A and furnace 16 prior to entering the primary stage catalytic reactor system 20. A typical distillate mode first stage reactor system 20 is shown. A multi-reactor system is employed with inter-zone cooling, whereby the reaction exotherm can be carefully controlled to prevent excessive temperature above the normal moderate range of about 200° to 290° C. (400°-550° F.), especially in the final reaction zone. While process pressure may be maintained over a wide range, usually from about 2000 to over 20,000 kPa (300-3000 psia), the preferred pressure is about 7000 to 15,000 kPa (1000 to 2000 psia). The feedstock is heated to reaction temperature and carried sequentially through a series of zeolite beds 20A, B, C wherein at least a portion of the olefin content is converted to heavier distillate constituents. Advantageously, the maximum temperature differential across only one reactor is about 30° C. ($\Delta T = \sim 50°$ F.) and the space velocity (WHSV based on olefin feed) is about 0.1 to 2. The heat exchangers 14A and 14B provide inter-reactor cooling.

In a typical continuous process run under steady state conditions using HZSM-5 catalyst, the average reactor temperature in the series of adiabatic fixed bed reactors is maintained below about 260° C. (500° F.). In order to optimize formation of high molecular weight $C_{10}^+$ hydrocarbons, effluent temperature from the terminal reactor 20C is kept substantially below about 290° C. (550° F.).

The effluent mixture from stage I enters a high temperature separator (HTS) 26, wherein high boiling product is recovered as a liquid rich in $C_{10}^+$ hydrocarbons; while vaporizing volatile components of the effluent stream, including light gas and lower hydrocarbons, such as $C_1$ to $C_9$ aliphatics. Preferably, the major portion (e.g. 50% to more than 90 wt %) of $C_{10}^+$ hydrocarbon components are contained in the high boiling liquid fraction. Overhead vapor is withdrawn through conduit 27, cooled indirectly by incoming feedstock in exchanger 12 to condense a major amount of $C_5$-$C_9$ gasoline range hydrocarbons for recovery in the second low temperature phase separation unit (LTS) 30. This condensed stream is withdrawn through conduit 32 to provide essentially all of the liquid olefinic recycle stream and pressurized by pump means 34 prior to combining with feedstock. Advantageously, the major portion of $C_5$ to $C_9$ hydrocarbon components are contained in this liquified recycle stream; however, an optional recycle stream 36 may be obtained from distilled raw gasoline. By controlling the moderate reaction temperature, especially in the last bed, undesired cracking of the product $C_{10}^+$ hydrocarbons is minimized. Advantageously, both stages contain HZSM-5 catalyst and are operated continuously and/or batchwise. By contacting the primary stage heavy effluent fraction with an acid exchange resin or other adsorbent in neutralizer unit 40 between stages any residual nitrogeneous base is removed.

The secondary stage usually is maintained at an average temperature less than about 260° C. at elevated pressure greater than about 2000 kPa and weight hourly space velocity less than 1 hr$^{-1}$. An olefinic intermediate stream from units 26, 40 is pressurized by pump 42, and heated by effluent heat exchanger 42 and furnace 44 prior to entering the Stage II reactor 50 for further oligomerization conversion to produce lubricant, raw olefinic gasoline, distillate, etc., the Stage II effluent may be cooled in exchanger 42 or by-passed via line 54 and furnace 56 prior to flashing in phase separator 60. Overhead containing gasoline $C_4$ light gas and light distillate may be recovered as product and/or recycled via line 64 to the reactor stage(s).

Advantageously, the secondary effluent liquid stream is fractionated to provide a major raw product stream consisting essentially of 290° C.+ aliphatic hydrocarbons comprising a major amount of $C_{10}$-$C_{20}$ distillate and $C_{20}$-$C_{60}$ aliphatic hydrocarbons. This raw olefinic product may then be hydrotreated in a separate process step (not shown) to provide a paraffinic lubricant and/or heavy distillate product. Details of a mild hydrogenation treatment may be obtained from U.S. Pat. No. 4,211,640, incorporated by reference, typically using Co or Ni with W/Mo and/or noble metals. The hydrotreated stream may be further fractionated to yield refined high grade lubricants of outstanding quality.

EXAMPLE A

Stage I Processing

Primary stage catalyst (HZSM-5) is pretreated by mixing the catalyst particles with a 10 wt % solution of 2,6-(t-butyl)-pyridine deactivating agent in hexane, solvent washing and drying to obtain a surface-deactivated material. An olefinic feedstock consisting of 27 weight percent propene, 36.1 wt % butene, 10.7 wt % propane and 26.1 wt % butane is cofed with gasoline recycle in a downflow fixed bed reactor system, as depicted, at 7000 kPa (1000 psig), about 0.4 WHSV and average reactor temperature of 205° C. (400° F.). The deactivating agent is injected with the olefinic feed at a concentration of about 50 weight parts per million, based on fresh feed. The results of the continuous run are shown below.

TABLE I

| Primary Stage Production of Intermediate Hydrocarbon | | |
|---|---|---|
| Hours on Stream | 42–54 | 114–126 |
| Olefin Conv., wt % | 98% | 98% |
| Yield, wt. % | | |
| LPG | 4 | 3 |
| Gasoline C5-165° C. | 31 | 35 |
| Distillate (165-345° C.) | 58 | 57 |
| Lubricant range 345° C. | 7 | 5 |
| | 100% | 100% |
| Lube Properties | | |
| Viscosity @ 38° C., cs | 14.68 | 11.97 |
| Viscosity @ 100° C., cs | 3.60 | 3.13 |
| V.I. | 131 | 126 |

Stage II Processing

The secondary reactor is charged with unmodified HZSM-5 catalyst having an acid cracking activity (α-value) of about 250. An enclosed stirred reactor is maintained at an average temperature of about 175° C. under autogenous pressure. The secondary feed is the 165°–345° C. distillate cut from the primary effluent (Table I), which is contacted with catalyst at a 10:1 ratio based on active catalysts at a space velocity of about 0.1 to 0.4 WHSV. The results of this run are tabulated below:

TABLE II

| Hours on Stream | 32–54 | 114–126 |
|---|---|---|
| Yield 650° F.+ Lube | 31.5 | 30.6 |
| Lube Properties | | |
| Viscosity, cs @ 104° F. | 22.49 | 21.75 |
| Viscosity, cs @ 212° F. | 4.50 | 4.48 |
| V.I. | 113 | 119 |

EXAMPLE B

Stage I

Ten parts by weight of 2,6-di-tert-butylpyridine modified small crystal (<0.1 microns) HZSM-5 as prepared in Example A and 100 parts propylene are heated to 200° C. in an autoclave under inert atmosphere with stirring. After 15 hours, the pressure decreases from 1240 to 33 psi, 100 parts propylene are charged and the temperature is adjusted to 200° C. After 29.5 more hours, the pressure decreases from 1150 to 260 psi, 100 parts propylene are again charged and the temperature adjusted to 200° C. After 66.3 hours from the second propylene addition, the reaction is stopped. An oil product, 167.8 gm, was obtained which contained only 2.8% 650° F.+ lube fraction.

Stage II 162 parts by weight of the product from Stage I and 15 parts of unmodified small crystal HZSM-5 zeolite are charged to an autoclave. After flushing the contents with nitrogen, the mixture is heated carefully to 100° C., and maintained 4 days (96 hours). No significant change in the oil takes places as indicated by GC results of samples withdrawn from the reaction mixture. The temperature is raised to 150° C. After 69 hours at 150° C., the 650° F.+ lube yield is determined to be 11.2%; after 92.7 hours, 16.7%: after 116.7 hours, 19.3%; after 140.8 hours, 23%; after 164.7 hours, 26.4%; after 236.7 hours, 31%. The reaction is stopped at this point and 138 gm product were recovered. After distillation, the 650°+ lube has kinematic viscosities of 31.1 cs at 104° F., 56 cs at 212° F. and a VI of 120. The pour point is −20° F.

EXAMPLE C

Stage I

Oligomers are prepared as described in Example B and fractionated. The fraction containing $C_9{=}$—$C_{18}{=}$ is used in the second stage to yield lube.

Stage II

One hundred parts of the $C_9{=}$—$C_{18}{=}$ fraction from the first stage are cooled to 0°–5° C. in a stirred reactor under dry nitrogen atmosphere. The oligomer mixture is saturated with $BF_3$. To this $BF_3$-olefin mixture is added 10 ml of $BF_3$ $C_4H_9OH$ complex, keeping the temperature of the reaction mixture between 0°–5° C. Samples are withdrawn periodically and their product compositions determined by gas chromatography. The results are tabulated below:

| Total Time | % Conversion to Lube | |
|---|---|---|
| Hours | 650° F.+ | 750° F.+ |
| 0 | 0 | 0 |
| 0.5 | 20.6 | 12.1 |
| 1.0 | 28.0 | 17.5 |
| 2.0 | 32.5 | 20.9 |
| 3.0 | 35.8 | 23.6 |
| 4.0 | 36.9 | 24.4 |
| 5.0 | 39.2 | 26.3 |

After 5 hours, the reaction mixture is neutralized with ammonia to form a white solid which is filtered off. The lube is obtained by
+lube has kinematic viscosities of distillation. The 650° F.+ lube has kinematic viscosities of 32.82 cs at 104° F., 5.00 cs at 212° F. and a VI of 63.

EXAMPLE D

Stage I

Follows the procedure of Example C above.

Stage II

The procedure of Example C is followed, except that the reaction is carried out for 0.5 hours. The 650° F.+ lube (~12%) has kinematic viscosities of 12.6 at 104° F., 3.2 cs at 212° F. and a VI of 127.

Examples C and D illustrate that lubes of high viscosities and of high viscosity index can be obtained when adequate reaction conditions are employed, such as by varying the total reaction time.

EXAMPLE E

Stage I

Fifteen parts by weight of large crystal HZSM-5 (>1 micron) of relatively low surface acidity and 300 parts propylene are heated to 200° C. in autoclave under inert atmosphere with stirring. After 46 hours the chraged propylene is converted to $C_6$=(22.5%), $C_9$=(46.5%), $C_{12}$=(12.5), $C_{15}$=(5.5%), $C_{18}$=(4.0%), $C_{21}$=(3.5%) and >$C_{21}$=(5.5%). This product mixture is used in the second stage reaction.

Stage II

Seventy parts of the total product from the first stage are heated over 7 parts of small crystal HZSM-5 (<0.1 micron) under inert atmosphere at 150° C. The lube conversion is monitored periodically by GC. A conversion of 42% to 650° F.+ lube is accomplished in 180 hours. This lube has kinematic viscosities of 34.25 at 104° F., 5.85 at 212° F. and a VI of 113.

Various modifications can be made to the system, especially in the choice of equipment and non-critical processing steps. While the invention has been described by specific examples, there is no intent to limit the inventive concept as set forth in the following claims.

It is claimed:

1. A multi-stage process for producing hydrocarbons by oligomerizing lower olefin feed at elevated temperature and pressure which comprises
contacting the lower olefin in a primary reactor stage under oligomerization conditions with a medium pore shape-selective siliceous zeolite catalyst having acid cracking activity, and a constraint index of about 1 to 12; wherein said zeolite has internal acidic pore activity and wherein the zeolite surface is rendered substantially inactive for acidic reactions by chemisorption of a surface deactivating agent; and
contacting at least a portion of the primary stage effluent in a secondary reactor stage with an acid catalyst to produce a high viscosity index lubricant range hydrocarbon.

2. The process of claim 1 wherein the zeolite consists essentially of aluminosilicate HZSM-5 having a silica to alumina molar ratio at least 12, the zeolite surface acidity being neutralized by a sterically-hindered amine having an effective cross section larger than 5 Angstroms.

3. The process of claim 2 wherein 2, 6-di(t-butyl)-pyridine is injected at concentration of at least 5 ppm into a continuous feed stream comprising $C_3+$ mon-olefins.

4. The process of any of claims 1 to 3 wherein lubricant range hydrocarbons boiling above 345° C. have a viscosity index of at least about 95.

5. The process of claim 1 including the step of separating the primary stage effluent to obtain a heavy fraction rich in substantially linear $C_{10}+$ olefins; and wherein a light fraction is recovered from the primary stage effluent for recycle and conversion with the lower olefin feed.

6. The process of claim 1 wherein the primary stage is operated continuously in a series of fixed bed downflow reactors by adding a sterically-hindered nitrogenous base to lower olefin feed at a rate sufficient to maintain surface inactivity in the catalyst.

7. The process of claim 6 wherein 2, 6-di(t-butyl)-pyridine is injected into the feed at a concentration of about 5 to 1000 ppm, and wherein the secondary stage acid catalyst comprises $BF_3$.

8. The process of claim 6 wherein the catalyst is pretreated with a surface-deactivating amount of the base and is essentially free of carbonaceous deposits.

9. The process of claim 6 wherein both stages contain HZSM-5 catalyst and are operated continuously; and further comprising the steps of: contacting the primary stage heavy effluent fraction with an adsorbent between stages to remove any residual nitrogenous base; and maintaining the secondary stage at an average temperature less than about 260° C. at elevated pressure greater than about 2000 kPa and weight hourly space velocity less than 1 $hr^{-1}$.

10. In a continuous process for converting lower olefinic feed to heavier hydrocarbons by contacting the feed with a shape selective medium pore acidic zeolite catalyst at elevated temperature and pressure; the improvement which comprises:
adding to the olefinic feed an inactivating amount of a sterically-hindered organic base, whereby the catalyst is selectively surface-deactivated by chemisorption, to produce substantially linear heavier hydrocarbons rich in $C_{10}+$ olefins.

11. The process of claim 10 wherein the olefinic feed comprises $C_2$-$C_8$ olefins; the catalyst comprises aluminosilicate having a silica-to-alumina mole ratio of at least 12 and a constraint index of about 1 to 12 prior to deactivation treatment; and the organic base comprises a di-(ortho-alkyl) substituted pyridine.

12. The process of claim 11 wherein the olefinic feed consists essentially of $C_3$-$C_4$ aliphatics; the catalyst consists essentially of a fixed bed of HZSM-5 particles having an acid cracking value prior to deactivation treatment of about 50 to 300, and the process is conducted at a temperature of about 150° C. to 290° C., a pressure of at least about 1500 kPa and weight hourly space velocity of about 0.1 to 2 $hr^{-1}$.

13. The process of any claims 10 to 12 comprising the further steps of fractionating the process effluent to recover a $C_{10}+$ heavy fraction; contacting the heavy fraction with an acid to neutralize residual base; and further oligomerizing the heavy fraction in contact with an acidic catalyst to produce a high viscosity index lubricant quality oil.

14. The process of claim 13 wherein the acid catalyst comprises and aluminosilicate zeolite.

15. The process of claim 14 wherein the acid catalyst consists essentially HZSM-5.

* * * * *